US007685330B2

(12) United States Patent
Banerjee et al.

(10) Patent No.: US 7,685,330 B2
(45) Date of Patent: Mar. 23, 2010

(54) METHOD FOR EFFICIENT DETERMINATION OF MEMORY COPY VERSUS REGISTRATION IN DIRECT ACCESS ENVIRONMENTS

(75) Inventors: Dwip N. Banerjee, Austin, TX (US); Shouchun Li, Round Rock, TX (US); Jeffrey P. Messing, Round Rock, TX (US); Rashmi Narasimhan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 11/372,384

(22) Filed: Mar. 9, 2006

(65) Prior Publication Data

US 2007/0239905 A1  Oct. 11, 2007

(51) Int. Cl.
 *G06F 13/28* (2006.01)
 *G06F 12/08* (2006.01)
(52) U.S. Cl. .......................... 710/22; 711/137
(58) Field of Classification Search ............ 710/22; 370/241
 See application file for complete search history.

(56) References Cited

U.S. PATENT DOCUMENTS 5,636,342 A * 6/1997 Jeffries ..................... 714/48
6,594,712 B1 * 7/2003 Pettey et al. .............. 710/22
6,598,144 B1 * 7/2003 Bailey et al. ............. 711/203
6,678,795 B1 * 1/2004 Moreno et al. ........... 711/137
6,691,217 B2 * 2/2004 Beukema et al. ......... 711/170
6,789,143 B2   9/2004 Craddock et al.
2005/0220128 A1 * 10/2005 Tucker et al. ............. 370/412

OTHER PUBLICATIONS

"Method for safe and efficient registration, usage, and deregistration of pinned user-space memory", Disclosed Anonymously, IP.com, Inc., Prior Art Database, IP.com No. IPCOM000124296D, Apr. 14, 2005, http://www.ip.com/pubview/IPCOM000124296D, 9 pages.

* cited by examiner

*Primary Examiner*—Henry W. H. Tsai
*Assistant Examiner*—Titus Wong
(74) *Attorney, Agent, or Firm*—Stephen R. Tkacs; Stephen J. Walder, Jr.; Matthew W. Baca

(57) ABSTRACT

A memory registration abstraction layer includes decision logic for dynamic, efficient determination of memory copy versus registration. The exemplary embodiments apply to direct memory access environments. The memory registration abstraction layer also includes tracking logic for monitoring the usage history for certain ranges of memory registration requests. The registration logic chooses to copy memory or map memory based on training and observation of application behavior, taking the more efficient performance path without requiring changes to the application.

13 Claims, 7 Drawing Sheets

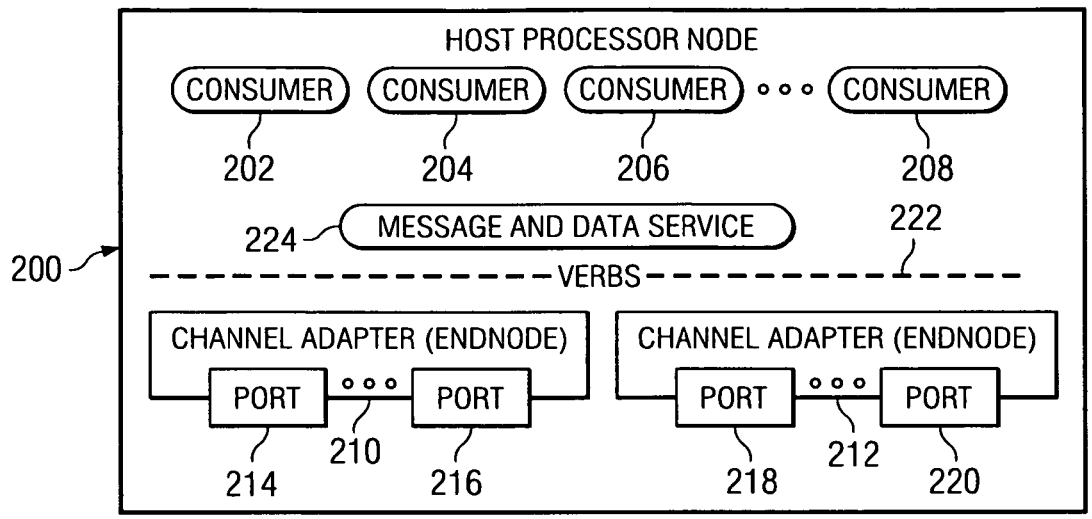
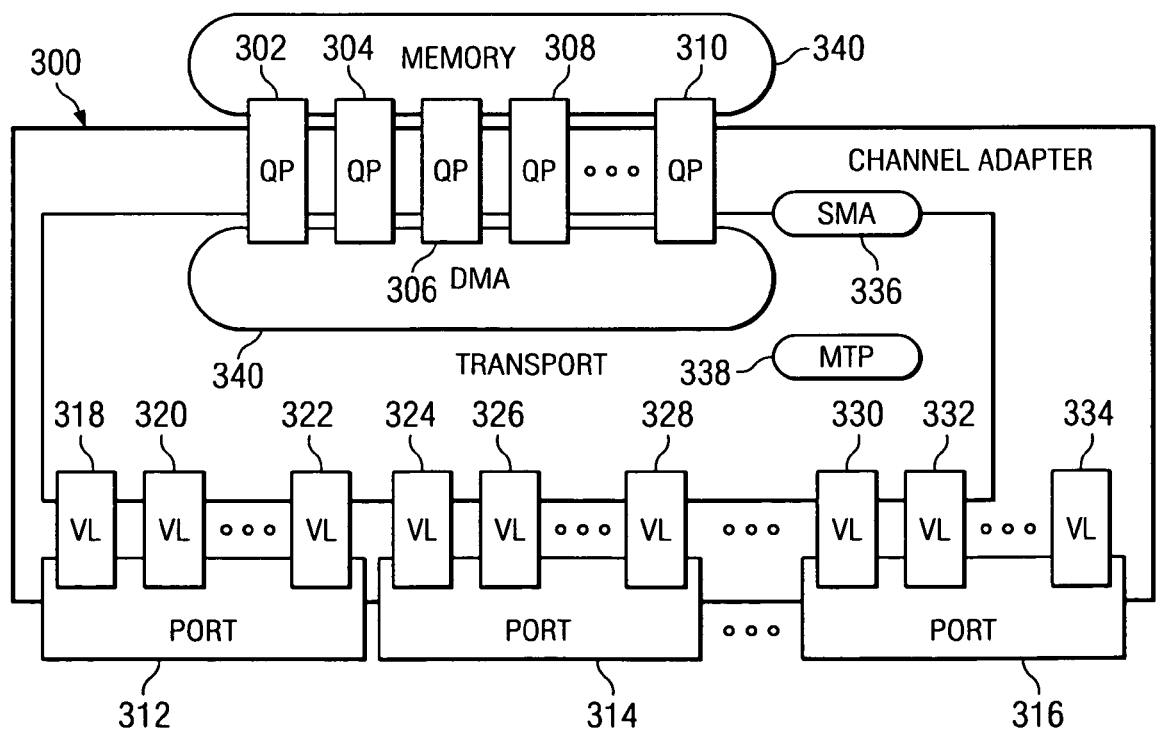

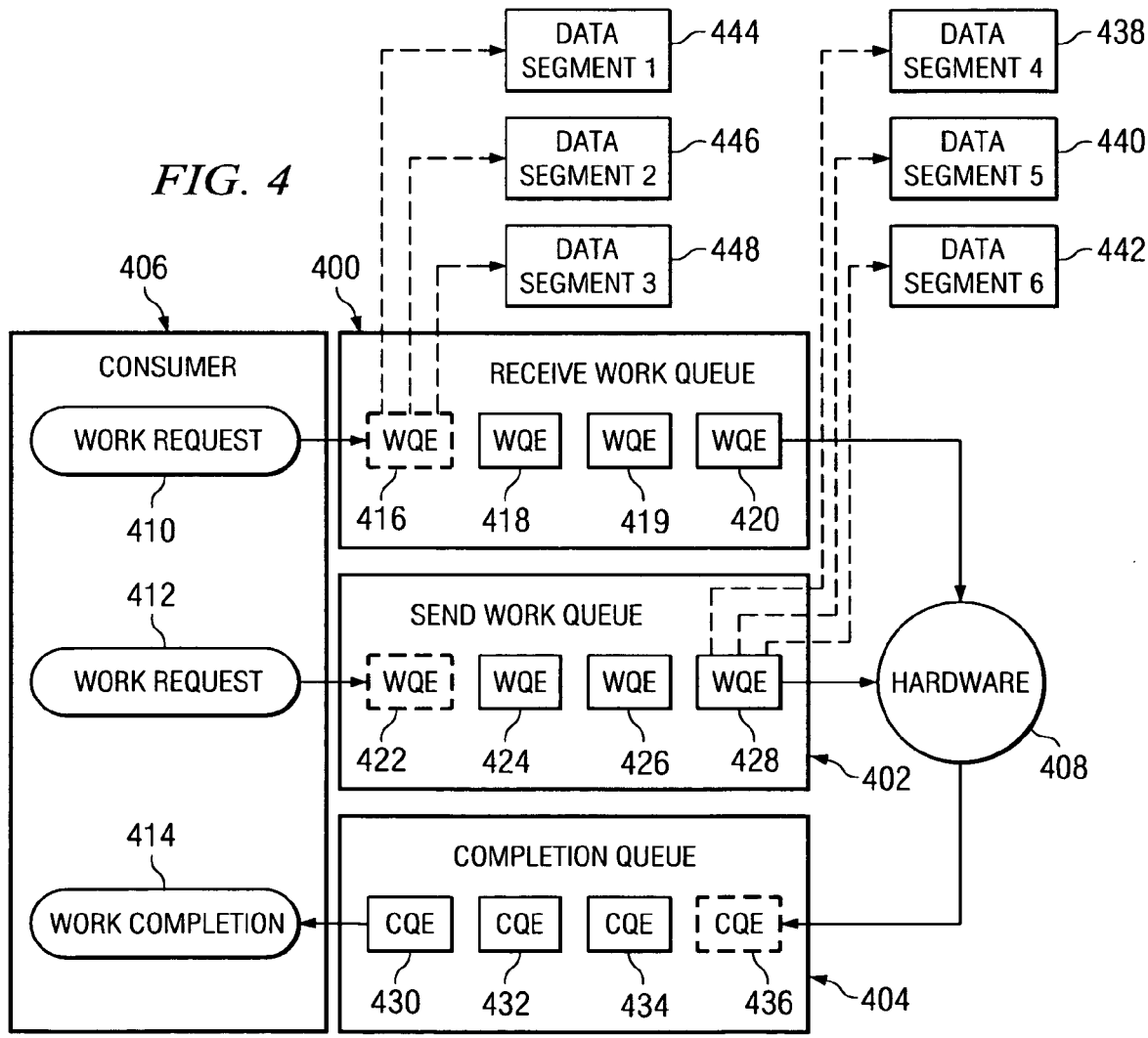

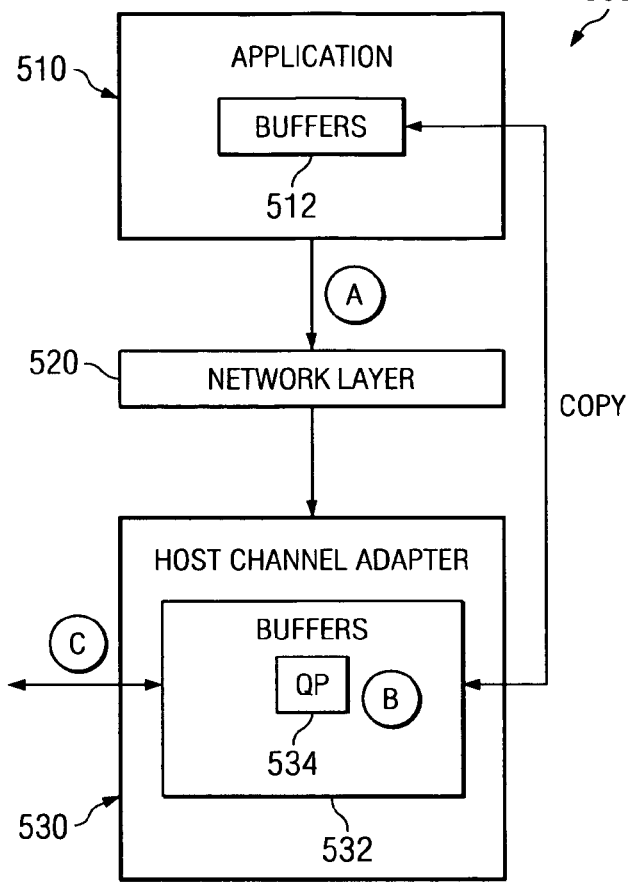
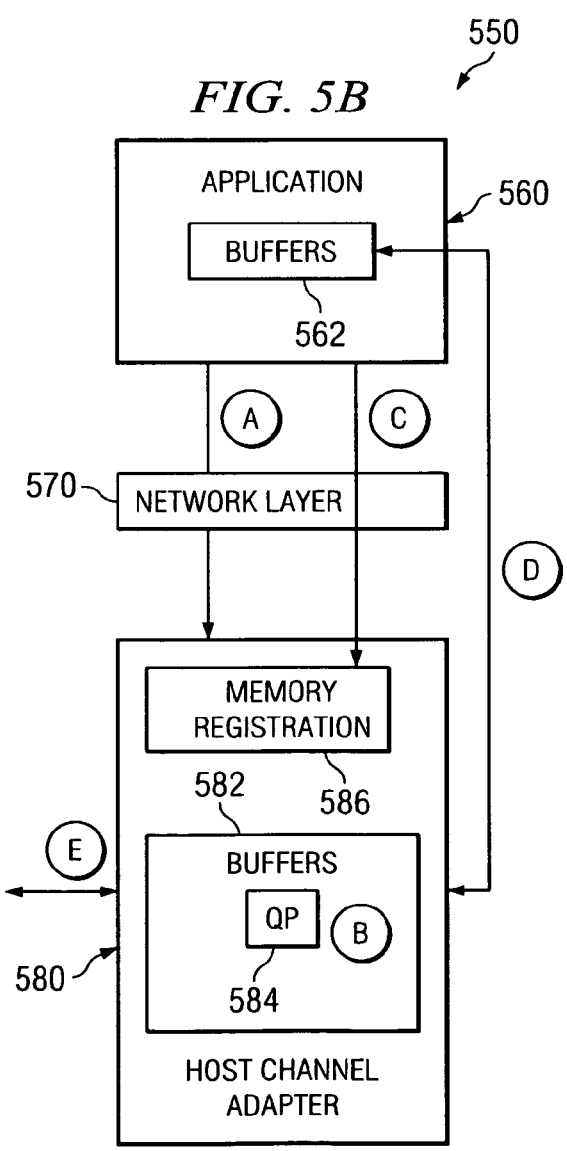

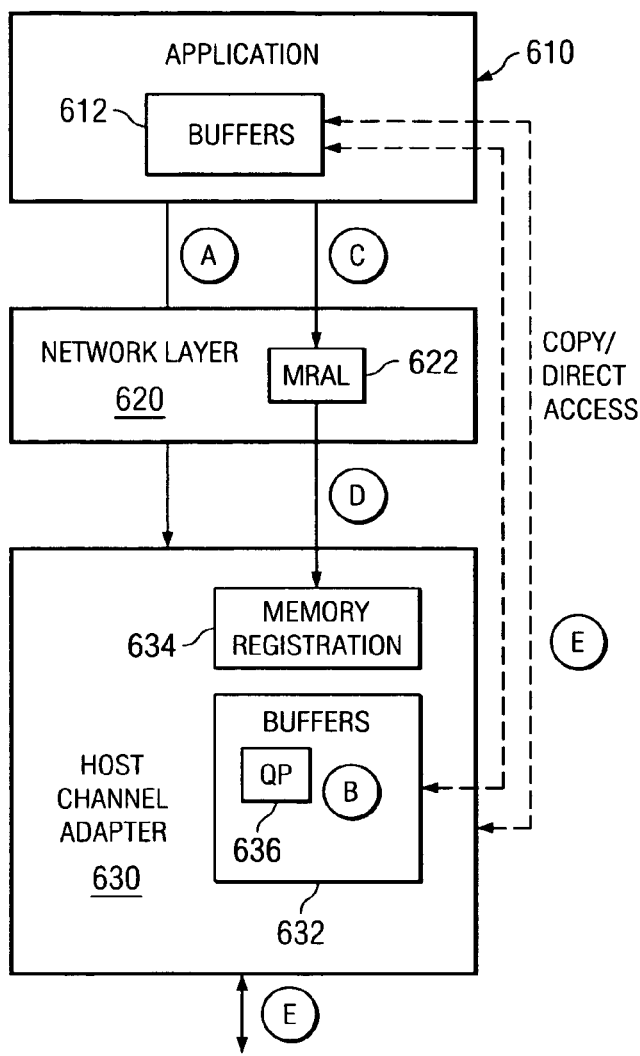
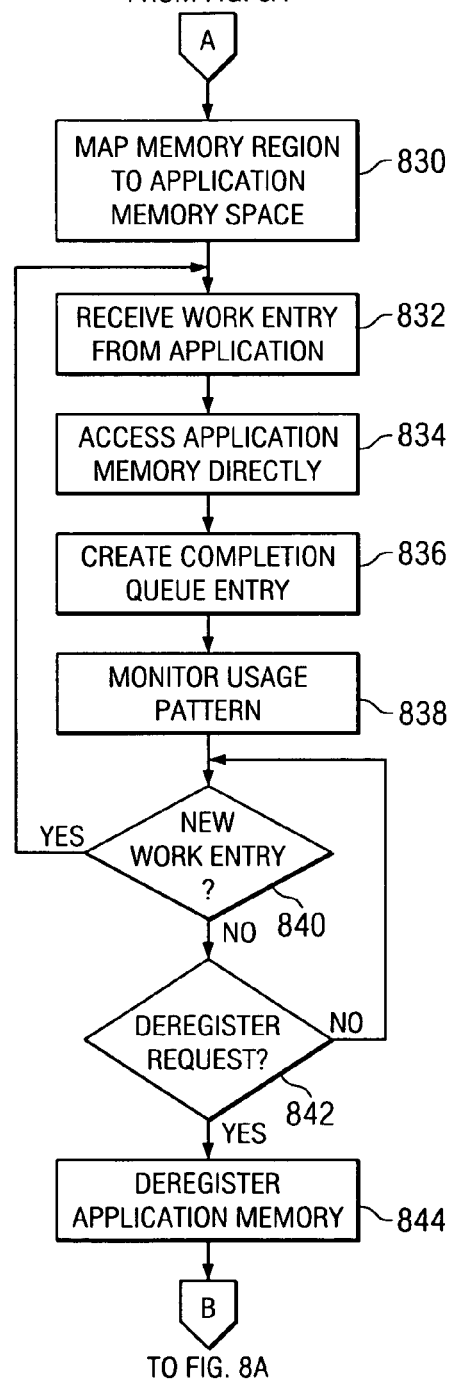

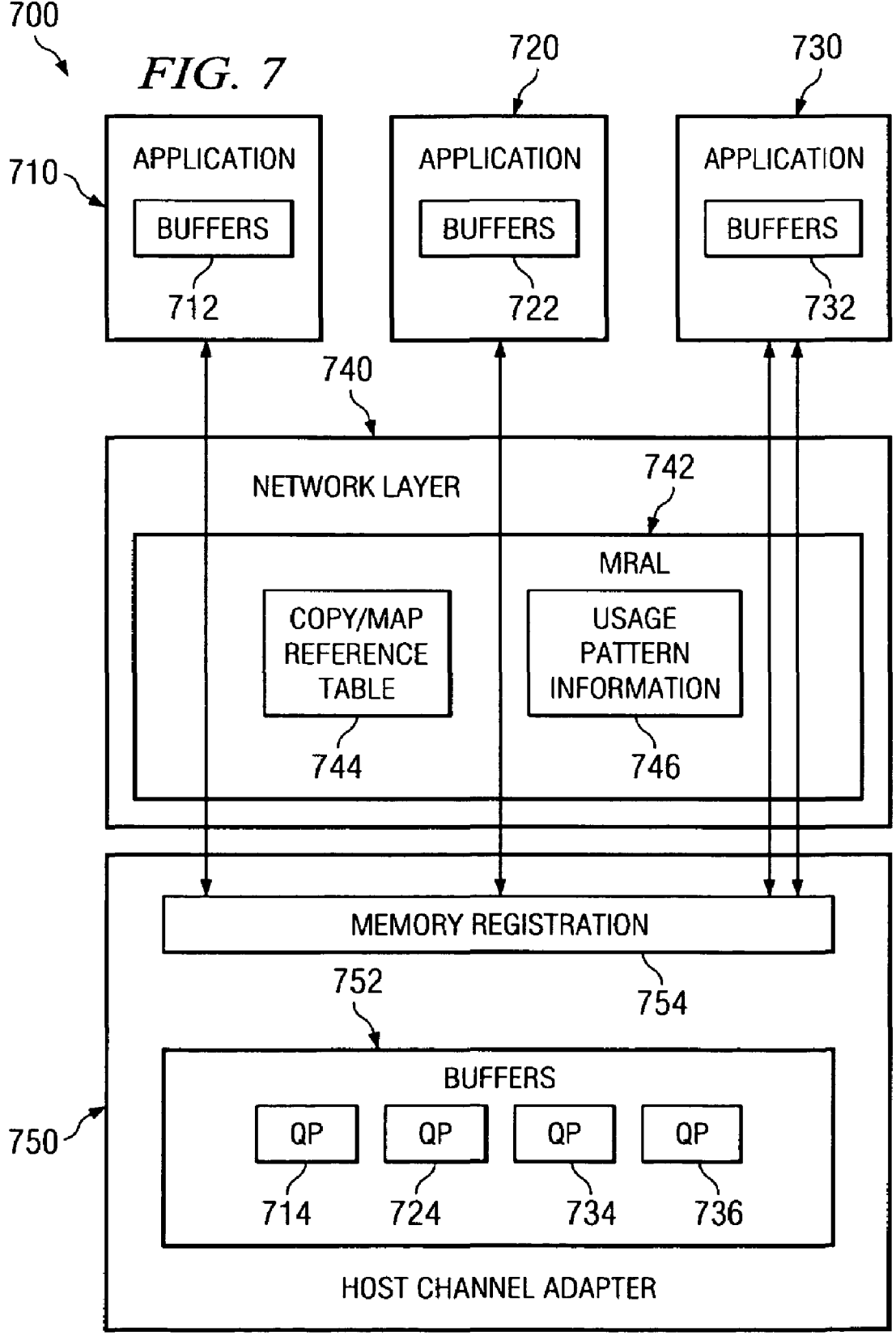

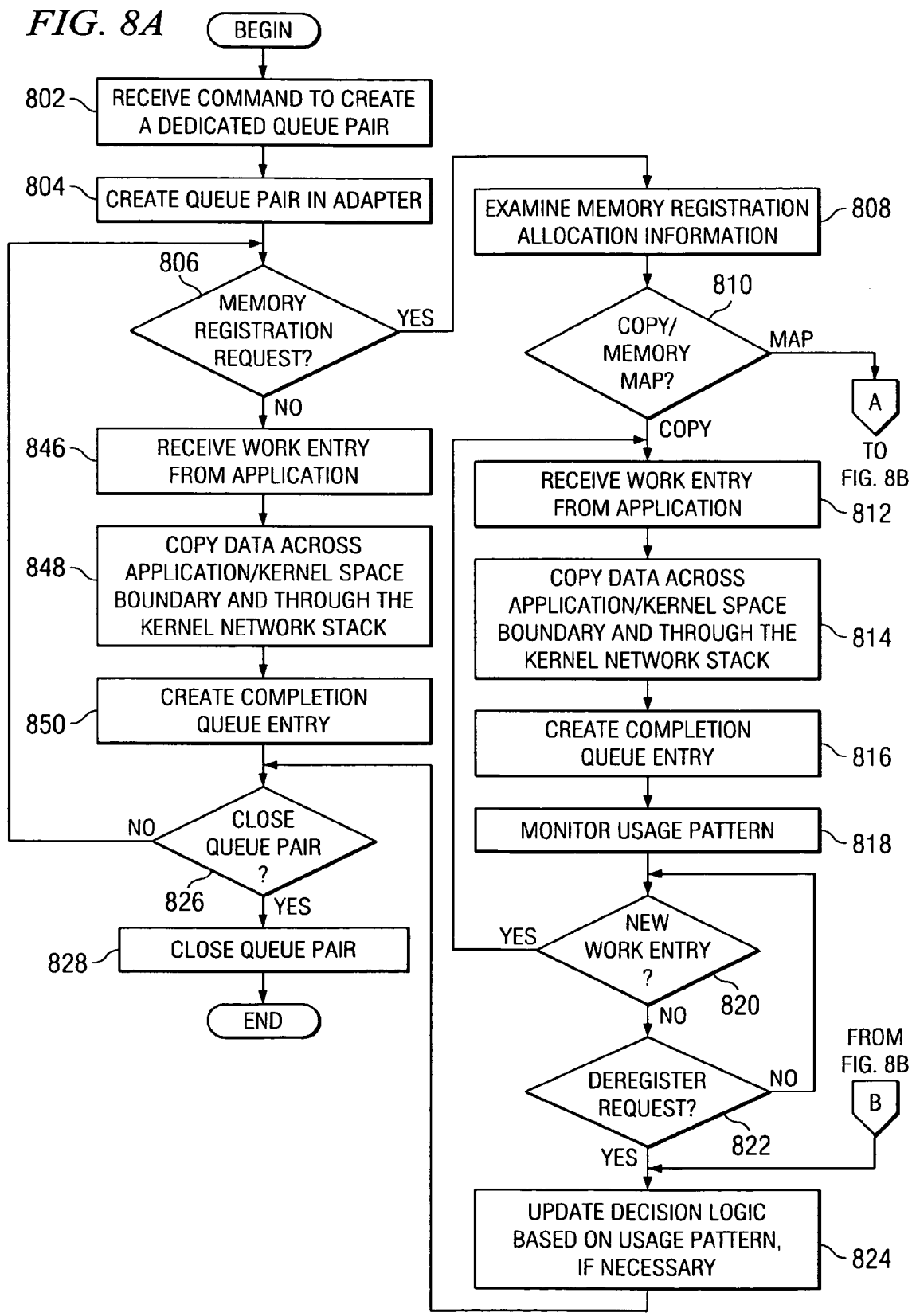

METHOD FOR EFFICIENT DETERMINATION OF MEMORY COPY VERSUS REGISTRATION IN DIRECT ACCESS ENVIRONMENTS

BACKGROUND

1. Technical Field:

The present disclosure relates generally to an improved data processing system and method. More specifically, the present application is directed to a method and apparatus for efficient determination of memory copy versus registration in direct access environments.

2. Description of Related Art:

InfiniBand™ (IB) provides a hardware message passing mechanism which can be used for Input/Output (I/O) devices and Interprocess Communications (IPC) between general computing nodes. "InfiniBand" is a trademark and service mark of The InfiniBand$^{SM}$ Trade Association in the United States, other countries, or both. Consumers access Infini-Band™ message passing hardware by posting send/receive messages to send/receive work queues on an InfiniBand™ channel adapter (CA). The send/receive work queues (WQ) are assigned to a consumer as a queue pair (QP). Consumers retrieve the results of these messages from a completion queue (CQ) through InfiniBand™ send and receive work completions (WC). The source channel adapter takes care of segmenting outbound messages and sending them to the destination. The destination channel adapter takes care of reassembling inbound messages and placing them in the memory space designated by the destination's consumer.

There are two channel adapter types: host channel adapter and target channel adapter. The host channel adapter (HCA) is used by general purpose computing nodes to access the Infini-Band™ fabric. Consumers use InfiniBand™ verbs to access host channel adapter functions. The software that interprets verbs and directly accesses the channel adapter is known as the channel interface (CI).

Sending involves preparing a request work queue element (WQE) and posting it to the send queue of the queue pair. Receiving comprises posting a receive work queue element, which will be filled up when the data arrives. Completions, referred to here as completion queue entries (CQEs), are generated after these actions are done. The completion queue can be reaped by the user, or consumer, to find out the completion status of the I/O operation.

In order to avoid copying data across the application/kernel space boundary and through the kernel network stack, a user, such as an application in a host, may use a dedicated queue pair. In this case, the memory used in the send/receive queue pair is application memory. This requires that users have the ability to map and register memory with the channel adapter so that the adapter can use the user's memory buffers.

Generally, users map their buffers to enable direct access by the adapter to eliminate memory copies. This may lead to substantial gains in performance. Memory registration comes at a price, since the cost of memory registration is nontrivial. However, memory registration is very efficient when its cost is amortized over time when the consumer uses the same buffers and also in static environments.

SUMMARY

The exemplary embodiments recognize the disadvantages of the prior art and provide a memory registration abstraction layer that includes decision logic for dynamic, efficient determination of memory copy versus registration. The exemplary embodiments apply to direct memory access environments. The memory registration abstraction layer may be logic code within the network layer between an application and a channel adapter. The memory registration abstraction layer also includes tracking logic for monitoring the usage history for certain ranges of memory registration requests. In response to a request to register a region of memory being received from an application, the decision logic chooses to copy memory or map memory based on training and observation of application behavior, taking the more efficient performance path without requiring changes to the application. The illustrative embodiments provide such an apparatus, program product, and method.

In one illustrative embodiment, an application creates a queue pair at a channel adapter for an application. Responsive to a memory registration request from the application to register a region of application memory, the memory registration abstraction layer determines whether to register the region of application memory or to perform memory copying based on registration decision logic. Responsive to a determination to perform memory copying, the channel adapter receives a work queue element from the application in the queue pair for a direct memory access data transfer and copies data between the application memory and adapter memory to perform the direct memory access data transfer.

In one exemplary embodiment, the memory registration abstraction layer determines whether to register the region of application memory or to perform memory copying by determining whether the region of application memory is associated with a short-lived transaction. In a further exemplary embodiment, the memory registration abstraction layer determining whether the amount of memory in the region of application memory is below a predetermined threshold. In another further exemplary embodiment, the memory registration abstraction layer determines whether the address range of the region of application memory is indicated in a copy/map reference table as an address range to not register.

In another illustrative embodiment, the memory registration abstraction layer determines whether to register the region of application memory or to perform memory copying by determining whether the queue pair corresponds to an application function with data transmission/reception characteristics associated with a short-lived transaction.

In one illustrative embodiment, a method for dynamic determination of memory copy versus memory registration in a direct access environment is provides. The method may comprise creating a queue pair at a channel adapter for an application and, responsive to a memory registration request from the application to register a region of application memory, determining whether to register the region of application memory or to perform memory copying based on registration decision logic. The method may further comprise, responsive to a determination to perform memory copying, receiving a work queue element from the application in the queue pair for a direct memory access data transfer and copying data between the application memory and adapter memory to perform the direct memory access data transfer.

In one exemplary embodiment, determining whether to register the region of application memory or to perform memory copying may comprise determining whether the region of application memory is associated with a short-lived transaction. In a further exemplary embodiment, determining whether the region of application memory is associated with a short-lived transaction may comprise determining whether the amount of memory in the region of application memory is below a predetermined threshold. Alternatively, determining whether the region of application memory is associated with a short-lived transaction may comprise determining whether the address range of the region of application memory is indicated in a copy/map reference table as an address range to not register.

In another exemplary embodiment, determining whether to register the region of application memory or to perform memory copying may comprise determining whether the queue pair corresponds to an application function with data transmission/reception characteristics associated with a short-lived transaction.

In yet another exemplary embodiment, the method may further comprise, responsive to a determination to register the region of application memory, mapping the region of application memory. The method may further comprise accessing, by the channel adapter, the region of application memory directly to perform the direct memory access data transfer.

The method may further comprise, responsive to a memory deregistration request from the application to deregister the region of application memory, determining whether to deregister the region of application memory.

In another embodiment, the method may further comprise monitoring a usage pattern associated with the memory registration request. The method may further comprise updating the registration decision logic based on the usage pattern.

In another illustrative embodiment, an apparatus for dynamic determination of memory copy versus memory registration in a direct access environment may be provided. The apparatus may comprise an application running on a data processing system, a channel adapter, and a network layer between the application and the channel adapter. The channel adapter may create a queue pair for the application. Responsive to a memory registration request from the application to register a region of application memory, the network layer may determine whether to register the region of application memory or to perform memory copying based on registration decision logic. Responsive to a determination to perform memory copying, the channel adapter may receive a work queue element from the application in the queue pair for a direct memory access data transfer and copy data between the application memory and adapter memory to perform the direct memory access data transfer.

In other exemplary embodiments, the apparatus performs various ones of the operations outlined above with regard to the method in the illustrative embodiments.

In another illustrative embodiment, a computer program product comprising a computer useable medium having a computer readable program is provided. The computer readable program, when executed on a computing device, may cause the computing device to create a queue pair at a channel adapter for an application. The computer readable program may further cause the computing device, responsive to a memory registration request from the application to register a region of application memory, to determine whether to register the region of application memory or to perform memory copying based on registration decision logic. Further, the computer readable program may cause the computing device, responsive to a determination to perform memory copying, to receive a work queue element from the application in the queue pair for a direct memory access data transfer and copy data between the application memory and adapter memory to perform the direct memory access data transfer.

In other exemplary embodiments, the readable program may cause the computing device to perform various ones of the operations outlined above with regard to the method in the illustrative embodiments.

These and other features and advantages will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a functional block diagram of a host processor node in accordance with an exemplary embodiment;

FIG. 3 is a diagram of a host channel adapter in accordance with an illustrative embodiment;

FIG. 4 is a diagram illustrating processing of work requests in accordance with an exemplary embodiment;

FIGS. 5A and 5B are block diagrams illustrating queue pair creation and usage in accordance with exemplary embodiments;

FIG. 6 is a block diagram illustrating dynamic copy versus registration determination in accordance with an exemplary embodiment;

FIG. 7 is a block diagram illustrating a host processor node featuring dynamic copy versus registration determination at the user level and the queue pair level in accordance with an exemplary embodiment; and FIGS. 8A and 8B are flowcharts outlining an exemplary operation for dynamic determination of memory copy versus registration in accordance with an exemplary embodiment.

DETAILED DESCRIPTION OF THE PREFERRED EMBODIMENTS

Figure 1:
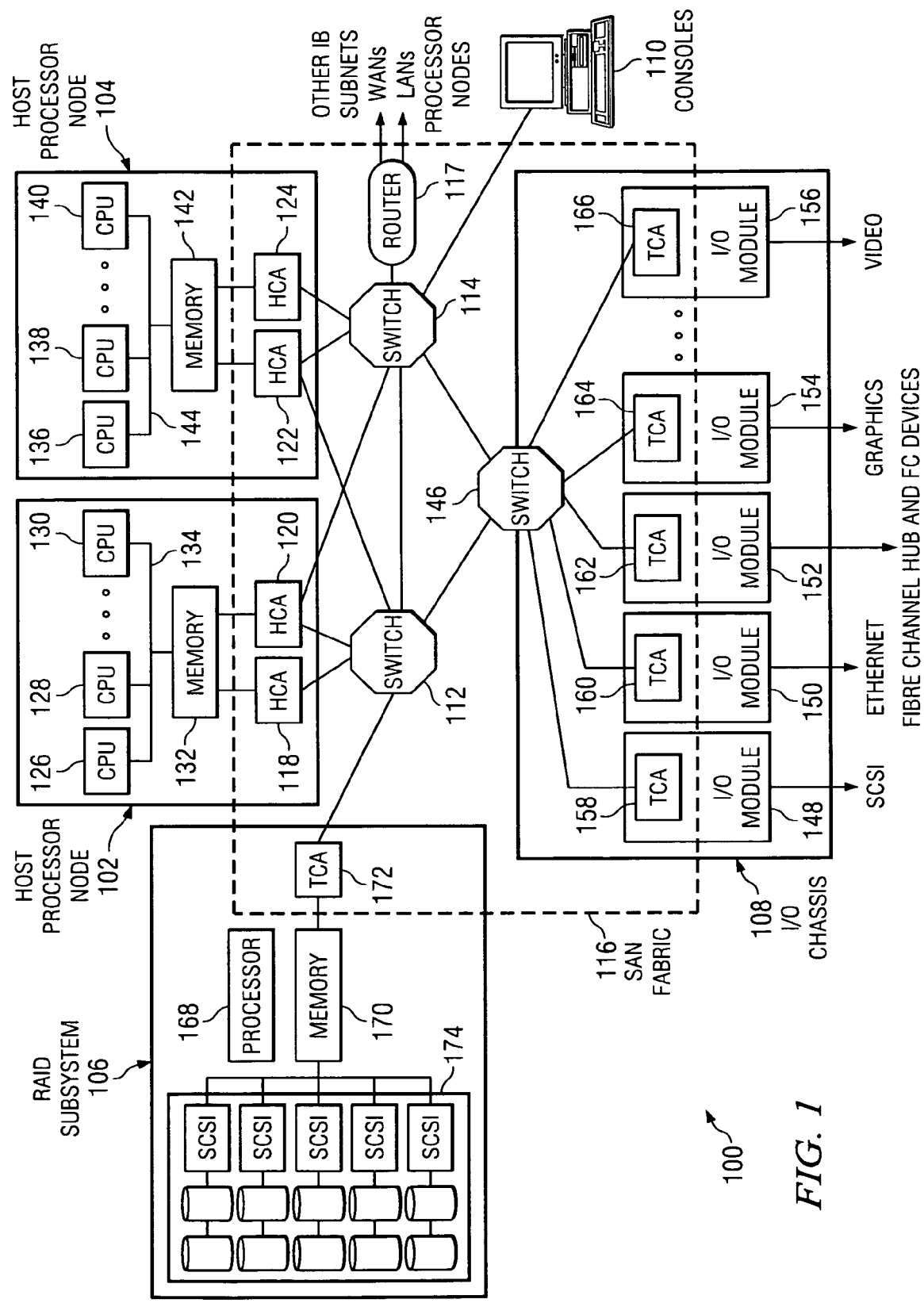
FIG. 1 is a diagram of a distributed computer system in accordance with an exemplary embodiment.

The present invention provides an apparatus and method for dynamic, efficient determination of memory copy versus registration in direct access environments, such as an InfiniBand™ network. A system area network (SAN) is a distributed computing system having end nodes, switches, routers, and links interconnecting these components. Each end node uses send and receive queue pairs to transmit and receives messages. The end nodes segment the message into packets and transmit the packets over the links. The switches and routers interconnect the end nodes and route the packets to the appropriate end node. The end nodes reassemble the packets into a message at the destination.

With reference now to the figures and in particular with reference to FIG. 1, a diagram of a distributed computer system is illustrated in accordance with an exemplary embodiment. The distributed computer system represented in FIG. 1 takes the form of a system area network (SAN) 100 and is provided merely for illustrative purposes, and the embodiments described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array of independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment, an error handling mechanism in distributed computer systems is present in which the error handling mechanism allows for reliable connection or reliable datagram communication between end nodes in distributed computing system, such as SAN 100.

A message, as the term is used herein, is an application-defined unit of data exchange, which is a primitive unit of communication between cooperating processes. A packet is one unit of data encapsulated by networking protocol headers and/or trailers. The headers generally provide control and routing information for directing the frame through a SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. SAN 100 shown in FIG. 1 includes a switched communications fabric 116, which allows many devices to concurrently transfer data with high bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

SAN 100 in FIG. 1 includes switch 112, switch 114, switch 146, and router 117. A switch is a device that connects multiple links together and allows routing of packets from one link to another link within a subnet using a small header destination local identifier (DLID) field. A router is a device that connects multiple subnets together and is capable of routing frames from one link in a first subnet to another link in a second subnet using a large header destination global identifier (DGID).

In one embodiment, a link is a full duplex channel between any two network fabric elements, such as endnodes, switches, or routers. Examples of suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126-130 and a memory 132 interconnected by bus system 134. Host processor node 104 similarly includes central processing units 136-140 and a memory 142 interconnected by a bus system 144. Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols.

In one embodiment, the host channel adapters and SAN 100 in FIG. 1 provide the I/O and inter-processor communications (IPC) consumers of the distributed computer system with zero processor-copy data transfers without involving the operating system kernel process, and employs hardware to provide reliable, fault tolerant communications. As indicated in FIG. 1, router 116 is coupled to wide area network (WAN) and/or local area network (LAN) connections to other hosts or other routers.

The I/O chassis 108 in FIG. 1 includes an I/O switch 146 and multiple I/O modules 148-156. In these examples, the I/O modules take the form of adapter cards. Example adapter cards illustrated in FIG. 1 include a small computer system interface (SCSI) adapter card for I/O module 148; an adapter card to fiber channel hub and fiber channel-arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158-166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and inter-processor communications. SAN 100 supports high bandwidth and scalability required for I/O and also supports the extremely low latency and low CPU overhead required for inter-processor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and inter-processor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Turning next to FIG. 2, a functional block diagram of a host processor node is depicted in accordance with an exemplary embodiment. Host processor node 200 is an example of a host processor node, such as host processor node 102 in FIG. 1. In this example, host processor node 200 shown in FIG. 2 includes a set of consumers 202-208, which are processes, or applications, executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202-208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202-208 to process messages and other data.

With reference now to FIG. 3, a diagram of a host channel adapter is depicted in accordance with an illustrative embodiment. Host channel adapter 300 shown in FIG. 3 includes a set of queue pairs (QPs) 302-310, which are used to transfer messages to the host channel adapter ports 312-316. Buffering of data to host channel adapter ports 312-316 is channeled through virtual lanes (VL) 318-334 where each VL has its own flow control. Subnet manager configures channel adapters with the local addresses for each physical port, i.e., the port's LID.

Subnet management agent (SMA) 336 is the entity that communicates with the subnet manager for the purpose of configuring the channel adapter. Memory translation and protection (MTP) 338 is a mechanism that translates virtual addresses to physical addresses and validates access rights. Direct memory access (DMA) 340 provides for direct memory access operations using memory 340 with respect to queue pairs 302-310.

A single channel adapter, such as the host channel adapter 300 shown in FIG. 3, can support thousands of queue pairs. By contrast, a target channel adapter in an I/O adapter typically supports a much smaller number of queue pairs. Each queue pair consists of a send work queue and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

With reference now to FIG. 4, a diagram illustrating processing of work requests is depicted in accordance with an exemplary embodiment. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422-428, describing data to be transmitted on the SAN fabric. Receive work queue 400 contains work queue elements (WQEs) 416-420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue entries (CQEs) 430-436. Completion queue entries contain information about previously completed work queue elements. Completion queue 404 is used to create a single point of completion notification for multiple queue pairs. A completion queue entry is a data structure on a completion queue. This entry describes a completed work queue element. The completion queue element contains sufficient information to determine the queue pair and specific work queue element that completed. A completion queue context is a block of information that contains pointers to the individual completion queues, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416, in receive work queue 400, references data segment 1 444, data segment 2 446, and data segment 3 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA Fetch and Add work queue element provides a memory semantic operation to perform an atomic operation on a remote word. The RDMA Fetch and Add work queue element is a combined RDMA Read, Modify, and RDMA Write operation. The RDMA Fetch and Add work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For inter-processor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

FIGS. 5A and 5B are block diagrams illustrating queue pair creation and usage in accordance with exemplary embodiments. More particularly, FIG. 5A illustrates data transfer with copying. Host processor node 500 includes application 510, network layer 520, and host channel adapter 530. Application 510 has buffers 512 available for processing. Host channel adapter 530 has buffers 532, which are memory segments that are allocated for networking.

In step A, application 510 issues a command to create a queue pair. Host channel adapter 530 creates queue pair (QP) 534 in adapter buffers 532 in step B. Also, application 510 maintains a representation (not shown) of queue pair 534 in memory buffers 512. Thereafter, for each work queue element, data are copied between application memory buffers 512 and adapter buffers 532 in host channel adapter 530, across the application/kernel space boundary and through network layer 520, for the transfer in step C. In other words, if a work queue element is a receive entry in step C, host channel adapter 530 receives data, stores the data in buffers 532, and copies the data to application memory buffers 512. On the other hand, if a work queue element is a send in step C, host channel adapter 530 copies data from application memory buffers 512 to adapter buffers 532 and sends the data to the InfiniBand™ fabric.

Copying of data between application memory and adapter memory is an inefficient operation. In order to avoid copying data, an application may use a dedicated QP. In this case, the memory used in the send and receive queues is application memory. This requires that users, such as applications, have the ability to map and register memory with the adapter to allow the adapter to access the application memory buffers.

FIG. 5B illustrates data transfer with memory mapping. Host processor node 550 includes application 560, network layer 570, and host channel adapter 580. Application 560 has buffers 562 available for processing. Host channel adapter 580 has buffers 582, which are memory segments that are allocated for networking. Host channel adapter 580 also includes memory registration 586.

In step A, application 560 issues a command to create a queue pair. Host channel adapter 580 creates queue pair (QP) 584 in adapter buffers 582 in step B. Also, application 560 maintains a representation (not shown) of queue pair 584 in memory buffers 562. Then, in step C, application 560 registers a region of its memory with host channel adapter 580. In step D, host channel adapter 580 maps the region of memory to the identified portion of application memory buffers 562. That is, host channel adapter 580 creates translation entries so the adapter can use the application buffers 562 directly. Memory registration may include, for example, a hash table of memory registration structures; however, the manner in which memory is registered or mapped is not a focus of this disclosure.

Normally, the adapter only has access to kernel memory that is allocated for networking. However, when application memory 562 is registered with adapter 580, application 560 may designate a segment of memory buffers 562 for transfer and adapter 580 may access that segment of memory 562 directly. Thus, in step E, when application 560 creates a work queue element, adapter 560 accesses memory 562 to send or receive data and sends the data to or receives the data from the InfiniBand™ fabric without having to copy the data between memory 582 and memory 562. When all work is completed, application 560 deregisters memory buffers 562.

Generally, users map their buffers to enable direct access to the adapter so that copies are eliminated. This leads to substantial gains in performance. However, the performance gains come at a price, because the cost of memory registration and deregistration is nontrivial. Memory registration, also referred to as mapping herein, is very efficient when its cost is amortized over time when the application uses the same buffers. For short-lived transactions or request-response environments, however, applications typically use their buffers only once. In these situations, it is inefficient to pay the cost of a memory registration and deregistration for a single use. Instead, it would be more efficient to use a copy function rather than memory mapping.

In accordance with an exemplary embodiment, a memory registration abstraction layer is provided between the application and the host channel adapter's memory registration function. The memory registration abstraction layer includes decision making logic that dynamically determines whether to use copying versus memory mapping. For example, when a request to register a region of memory is below a certain threshold, the memory registration abstraction layer may decide to copy in the buffers rather than to register the region of memory. Above the threshold, the memory registration abstraction layer may actually register the memory. Examples of short-lived transactions include database transactions and request-response transactions.

In one exemplary embodiment, the decision making logic may use a training algorithm. For example, if allocations in the range of 1200 to 1800 bytes are all following the same pattern of register—use once—immediate deregister, then the decision making logic may decide to copy future registration requests in this range. Outside of the ranges that are determined to be short-lived, the system still performs memory registration. Thus, the memory registration abstraction layer also includes tracking logic for monitoring the usage history for certain ranges of memory registration requests.

FIG. 6 is a block diagram illustrating dynamic copy versus registration determination in accordance with an exemplary embodiment. Host processor node 600 includes application 610, network layer 620, and host channel adapter 630. Application 610 has buffers 612 available for processing. Host channel adapter 630 has buffers 632, which are memory segments that are allocated for networking. Host channel adapter 630 also includes memory registration 634. Network layer 620 includes memory registration abstraction layer 622, which provides dynamic copy versus registration determination.

In step A, application 610 issues a command to create a queue pair. Host channel adapter 630 creates queue pair (QP) 636 in adapter buffers 632 in step B. Also, application 610 maintains a representation (not shown) of queue pair 636 in memory buffers 612. Then, in step C, application 610 attempts to register its memory with host channel adapter 630. In step D, memory registration abstraction layer 622 dynamically determines whether to use copying versus memory mapping. If memory registration abstraction layer determines that copying should be used, then when a work queue entries created by application 610, data are copied between application memory buffers 612 and host channel adapter memory 632, across the application/kernel space boundary and through network layer 620, in step E.

If, however, memory registration abstraction layer 622 decides to use memory mapping in step D, host channel adapter 630 maps the registered portion of application memory buffers 612. That is, host channel adapter 630 creates translation entries so the adapter can use the application buffers 612 directly. Memory registration 634 may include, for example, a hash table of memory registration structures; however, the manner in which memory is registered or mapped is not a focus of this disclosure.

When application memory 612 is registered with adapter 630, application 610 may designate a segment of memory buffers 612 for transfer and adapter 630 may access that segment of memory 612 directly. Thus, in step E, when application 610 creates a work queue element, adapter 630 accesses memory 612 to send or receive data and sends the data to or receives the data from the InfiniBand™ fabric without having to copy the data between memory 612 and memory 632. When all work is completed, application 610 deregisters memory buffers 612.

In accordance with another exemplary embodiment, the tracking methodology may be applied at the user level as well as the queue pair level. Thus, specific knowledge can be ascertained for different queue pairs based on the usage pattern. For example, queue pairs used for data and control functions (data and control sockets in certain applications, for instance) in an application typically have different data transmission/reception characteristics. The memory registration abstraction layer may train itself to determine the I/O characteristics over time and make decisions based on these characteristics. More particularly, the decision logic determines how long to keep the memory region registered and when and at what sizes to copy rather than register.

Still more particularly, the decision logic may determine whether to deregister a memory region. For example, the decision logic may counter a particular pattern where the application registers region A, uses once, deregisters, registers region A, uses once, deregisters, and so on. In this case, the decision logic may decide to register but not deregister until a transfer outside that memory region is encountered.

FIG. 7 is a block diagram illustrating a host processor node featuring dynamic copy versus registration determination at the user level and the queue pair level in accordance with an exemplary embodiment. Host processor node 700 includes applications 710, 720, 730, network layer 740, and host channel adapter 750. Application 710 has buffers 712 available for processing, application 720 has buffers 722 available for processing, and application 730 has buffers 732 available for processing. Host channel adapter 750 has buffers 752, which are memory segments that are allocated for networking. Host channel adapter 750 also includes memory registration 754. Network layer 740 includes memory registration abstraction layer 742, which provides dynamic copy versus registration determination.

Memory registration abstraction layer 742 includes copy/map reference table 744, for example, which is used as a lookup when an application registers a memory region. For instance, copy/map reference table 744 may simply store ranges of length values that are to be copied instead of registered. In an alternative embodiment, copy/map reference table 744 may store information about queue pairs that are to be copied. For example, copy/map reference table 744 may store an entry that indicates that all data and control sockets are to be copied.

In the depicted example, application 710 issues a command to create a queue pair. Host channel adapter 750 creates queue pair 714 in the adapter's buffers. As described above, application 710 also maintains a representation (not shown) of the queue pair in buffers 712. For simplicity, this description will only refer to the instance of the queue pair 714 in adapter memory buffers 752. In this instance, application 710 may have issued a memory registration request below a predetermined threshold or within a given range, which, according to copy/map reference table, indicates a short-lived transaction.

On the other hand, application 720 issues a command to create a queue pair, and host channel adapter 750 creates queue pair 724. When application 720 issues a memory registration request, memory registration abstraction layer 742 decides to map to a region of memory in application buffers 722. For each work queue element created by application 720 for queue pair 724, host channel adapter 750 accesses the mapped portion of buffers 722 directly to effectuate the data transfer.

Application 730 issues commands to create two queue pairs. Host channel adapter 750 creates queue pairs 734 and 736 in the adapter's buffers 752. In this instance, queue pair 734, for example, may be for a particular function with data transmission/reception characteristics that indicate short-lived transaction. Therefore, when application 730 makes a memory registration request associated with queue pair 734, memory registration abstraction layer 742 decides to copy rather than register. Then, when application 730 creates work queue entries for queue pair 734, data are copied from application buffers 732, across network layer 740 to adapter memory buffers 752.

On the other hand, when application 730 makes a memory registration request associated with queue pair 736, memory registration abstraction layer 742 may decide to perform the requested memory registration to the region of application buffers 732. Thus, for each work queue element created by application 730 for queue pair 736, host channel adapter 750 accesses the mapped portion of buffers 732 directly to effectuate the data transfer.

Furthermore, memory registration and abstraction layer 742 may determine whether to copy or map queue pairs based on the user level or the queue pair level. Still further, memory registration abstraction layer 742 may store usage pattern information 746. In this way, memory registration abstraction layer 742 may monitor usage for certain memory ranges and/or application functions. For example, if abstraction layer 742 maps allocations in the range of 1200 to 1800 bytes, but over time the usage pattern becomes register—use once—immediately deregister, then this pattern is stored in usage pattern information 746, and abstraction layer 742 may update copy/map reference table 744 to dynamically adjust the copy/map decision logic. This allows the applications to function without any knowledge of the usage pattern and the functionality can be encoded in memory registration abstraction layer 742, thereby allowing dynamic, on-the-fly characterization of data access.

FIGS. 8A and 8B are flowcharts outlining an exemplary operation for dynamic determination of memory copy versus registration in accordance with an exemplary embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

More particularly, with reference to FIGS. 8A and 8B, operation begins and the network layer receives a command from an application to create a dedicated queue pair (block 802), and the adapter creates the queue pair (block 804). The network layer determines whether a memory registration request is received (block 806). If a memory registration request is received, the network layer examines the memory registration allocation information (block 808). Then, the network layer determines whether to use copying or memory mapping (block 810). The determination of whether to use memory copying or registration may be based on the memory registration allocation information and/or data transmission/reception characteristics of the application.

If the network layer decides to use memory copying, the host channel adapter receives a work queue element from the application queue pair (block 812). The application then must copy data across the application/kernel space boundary and through the kernel network stack (block 814). The adapter then creates a completion queue entry and stores the completion queue entry in a completion queue for consumption by the application (block 816). In one exemplary embodiment, the network layer modifies the completion queue entry to include the address indicated by the application in the work queue element. In this embodiment, the application may continue operation without knowing that the data transfer used copying instead of memory registration. Thereafter, network layer monitors the usage pattern (block 818).

Next, the network layer determines whether the application has created a new work queue element (block 820). If a new work queue element is ready for consumption in the application queue pair, operation returns to block 812 where the host channel adapter receives the new work queue element from the application queue pair. If the application has not created a new work queue element in the application queue pair in block 820, the network layer determines whether a deregister request is received (block 822). If a deregister request is not received, operation returns to block 820 to determine whether the application has created a new work queue element.

If the network layer receives a deregister request in block 822, there is no need to actually deregister memory, because the adapter never actually registered the memory region. Therefore, the network layer simply updates the decision logic based on the usage pattern, if necessary (block 824). That is, if the usage pattern indicates that memory registration would be beneficial for the particular memory region or data transmission/reception characteristics of the application, then the network layer updates its decision logic to correctly handle the next memory registration request.

Thereafter, the adapter determines whether to close the queue pair (block 826). If the adapter determines that the queue pair is to be closed, the adapter closes the queue pair (block 828), and operation ends. If, however, the adapter determines that the application has more work entries for the queue pair, operation returns to block 806 to determine whether a memory registration request is received.

Returning to block 806, if the network layer decides to register memory, the host channel adapter maps the memory region to the application memory space (block 830). The adapter receives a work queue element from the application queue pair (block 832) and accesses the application memory directly to perform the data transfer (block 834). The adapter then creates a completion queue entry and stores the completion queue entry in a completion queue for consumption by the application (block 836). The network layer monitors the usage pattern (block 838).

Next, the network layer determines whether the application has created a new work queue element (block 840). If a new work queue element is ready for consumption in the application queue pair, operation returns to block 832 where the host channel adapter receives the new work queue element from the application. If the application has not created a new work queue element in block 840, the network layer determines whether a deregister request is received (block 842). If a deregister request is not received, operation returns to block 840 to determine whether the application has created a new work queue element.

If the network layer receives a deregister request in block 842, the host channel adapter deregisters the region of application memory. Then, operation proceeds to block 824 where the network layer updates the decision logic based on the usage pattern, if necessary. In this case, if the usage pattern indicates that memory registration is not actually beneficial for the particular memory region or data transmission/reception characteristics of the application, then the network layer updates its decision logic to correctly handle the next memory registration request.

Returning to block 806, if a memory registration request is not received, then the adapter receives a work queue element from the application (block 846). The application then copies data across the application/kernel space boundary and through the kernel network stack (block 848) normally, because the adapter did not request memory registration for the data transfer. The adapter then creates a completion queue entry and stores the completion queue entry in a completion queue for consumption by the application (block 850). Thereafter, operation proceeds to block 826 to determine whether to close the queue pair, as described above.

Thus, the exemplary embodiments include a memory registration abstraction layer, which includes decision logic for dynamic, efficient determination of memory copy versus registration. The exemplary embodiments apply to an InfiniBand™ network or other direct memory access environments. The memory registration abstraction layer also includes tracking logic for monitoring the usage history for certain ranges of memory registration requests. The registration logic chooses to copy memory or map memory based on training and observation of application behavior, taking the more efficient performance path without requiring changes to the application.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dynamic determination of memory copy versus memory registration in a direct access environment, the method comprising:

creating a queue pair at a channel adapter for an application;

responsive to a memory registration request from the application to register a region of application memory, determining whether to register the region of application memory or to perform memory copying based on registration decision logic;

responsive to a determination to perform memory copying, receiving a work queue element from the application in the queue pair for a direct memory access data transfer and copying data between the application memory and adapter memory to perform the direct memory access data transfer.

2. The method of claim 1, wherein determining whether to register the region of application memory or to perform memory copying comprises:

determining whether the region of application memory is associated with a short-lived transaction.

3. The method of claim 2, wherein determining whether the region of application memory is associated with a short-lived transaction comprises:

determining whether the amount of memory in the region of application memory is below a predetermined threshold.

4. The method of claim 2, wherein determining whether the region of application memory is associated with a short-lived transaction comprises:

determining whether the address range of the region of application memory is indicated in a reference table as an address range to not register.

5. A method for dynamic determination of memory copy versus memory registration in a direct access environment, the method comprising:

creating a queue pair at a channel adapter for an application;

responsive to a memory registration request from the application to register a region of application memory, determining whether to register the region of application memory or to perform memory copying based on registration decision logic; and responsive to a determination to perform memory copying, receiving a work queue element from the application in the queue pair for a direct memory access data transfer and copying data between the application memory and adapter memory to perform the direct memory access data transfer, wherein determining whether to register the region of application memory or to perform memory copying comprises:

determining whether the queue pair corresponds to an application function with data transmission/reception characteristics associated with a short-lived transaction.

6. The method of claim 1, further comprising:

responsive to a determination to register the region of application memory, mapping the region of application memory; and accessing, by the channel adapter, the region of application memory directly to perform the direct memory access data transfer.

7. The method of claim 6, further comprising:

responsive to a memory deregistration request from the application to deregister the region of application memory, determining whether to deregister the region of application memory.

8. A method for dynamic determination of memory copy versus memory registration in a direct access environment, the method comprising:

creating a queue pair at a channel adapter for an application;

responsive to a memory registration request from the application to register a region of application memory, determining whether to register the region of application memory or to perform memory copying based on registration decision logic, wherein determining whether to register the region of application memory or to perform memory copying comprises determining whether the address range of the region of application memory is indicated in a reference table as an address range to not register;

responsive to a determination to perform memory copying, receiving a work queue element from the application in the queue pair for a direct memory access data transfer and copying data between the application memory and adapter memory to perform the direct memory access data transfer;

monitoring a usage pattern associated with the memory registration request; and updating the registration decision logic based on the usage pattern, wherein updating the registration decision logic based on the usage pattern comprises updating the reference table based on the usage pattern.

9. The method of claim 5, further comprising:

responsive to a determination to register the region of application memory, mapping the region of application memory; and accessing, by the channel adapter, the region of application memory directly to perform the direct memory access data transfer.

10. The method of claim 9, further comprising:

responsive to a memory deregistration request from the application to deregister the region of application memory, determining whether to deregister the region of application memory.

11. The method of claim 5, further comprising:

monitoring a usage pattern associated with the memory registration request; and updating the registration decision logic based on the usage pattern.

12. The method of claim 8, further comprising:

responsive to a determination to register the region of application memory, mapping the region of application memory; and accessing, by the channel adapter, the region of application memory directly to perform the direct memory access data transfer.

13. The method of claim 12, further comprising:

responsive to a memory deregistration request from the application to deregister the region of application memory, determining whether to deregister the region of application memory.

* * * * *